US008010506B2

(12) United States Patent
Matsuda

(10) Patent No.: US 8,010,506 B2
(45) Date of Patent: Aug. 30, 2011

(54) INFORMATION PROCESSING SYSTEM AND NETWORK LOGGING INFORMATION PROCESSING METHOD

(75) Inventor: Takashi Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 312 days.

(21) Appl. No.: 12/274,781

(22) Filed: Nov. 20, 2008

(65) Prior Publication Data

US 2009/0132565 A1  May 21, 2009

(30) Foreign Application Priority Data

Nov. 20, 2007 (JP) .................... 2007-300258

(51) Int. Cl.
G06F 17/30 (2006.01)
G06F 11/34 (2006.01)
G06F 9/455 (2006.01)

(52) U.S. Cl. ............... 707/682; 714/38.1; 714/38.11; 714/38.13; 718/1

(58) Field of Classification Search .......... 707/609, 707/999.2, 674, 682; 709/224; 714/38.1, 714/38.11, 38.13; 718/1
See application file for complete search history.

(56) References Cited

U.S. PATENT DOCUMENTS

| | | | | |
|---|---|---|---|---|
| 5,724,501 A * | 3/1998 | Dewey et al. | ............... | 714/5.11 |
| 5,948,112 A * | 9/1999 | Shimada et al. | ............... | 714/16 |
| 6,654,880 B1 * | 11/2003 | Yamamoto | ............... | 713/1 |
| 6,681,348 B1 * | 1/2004 | Vachon | ............... | 714/45 |
| 7,069,470 B2 * | 6/2006 | Wilding et al. | ............... | 714/34 |
| 7,266,717 B2 * | 9/2007 | Cassell et al. | ............... | 714/6.12 |
| 7,290,175 B1 * | 10/2007 | Kessler et al. | ............... | 714/37 |
| 7,380,172 B2 * | 5/2008 | Srinivas et al. | ............... | 714/47.1 |
| 7,418,624 B2 * | 8/2008 | Ichikawa et al. | ............... | 714/5.11 |
| 7,574,627 B2 * | 8/2009 | Ogasawara et al. | ............... | 714/38.11 |
| 7,606,802 B2 * | 10/2009 | Gebhart et al. | ............... | 1/1 |
| 7,627,099 B2 * | 12/2009 | Amidi | ............... | 379/112.02 |
| 7,788,537 B1 * | 8/2010 | Yellen et al. | ............... | 714/38 |
| 2005/0071336 A1 * | 3/2005 | Najork et al. | ............... | 707/8 |
| 2005/0228769 A1 * | 10/2005 | Oshima et al. | ............... | 707/1 |
| 2005/0240806 A1 * | 10/2005 | Bruckert et al. | ............... | 714/6 |
| 2006/0041739 A1 * | 2/2006 | Iwakura et al. | ............... | 713/2 |
| 2006/0078092 A1 * | 4/2006 | Amidi | ............... | 379/9.05 |
| 2007/0074065 A1 * | 3/2007 | Suzuki | ............... | 714/5 |
| 2007/0111704 A1 * | 5/2007 | Linkert et al. | ............... | 455/405 |
| 2008/0201616 A1 * | 8/2008 | Ashmore | ............... | 714/57 |
| 2009/0228743 A1 * | 9/2009 | Ponnuswamy | ............... | 714/48 |

FOREIGN PATENT DOCUMENTS

| | | |
|---|---|---|
| JP | 02-101556 A | 4/1990 |
| JP | 11-003252 A | 1/1999 |
| JP | 2002-312205 | 10/2002 |

\* cited by examiner

Primary Examiner — James Trujillo
Assistant Examiner — Jorge A Casanova
(74) Attorney, Agent, or Firm — Fujitsu Patent Center

(57) ABSTRACT

An information processing system includes a memory, an external storage having a user's area and a system area, and a logging unit collecting communication information in the system. The information processing system further has a unit that receives a network logging activation instruction, and determines whether memory dump information at the point system freezing occurred exists in the system area or not, a unit that copies the network logging file to the system area if the conditions are satisfied, and a unit that writes the communication information stored and maintained in the memory dump information to the copied network logging file.

3 Claims, 10 Drawing Sheets

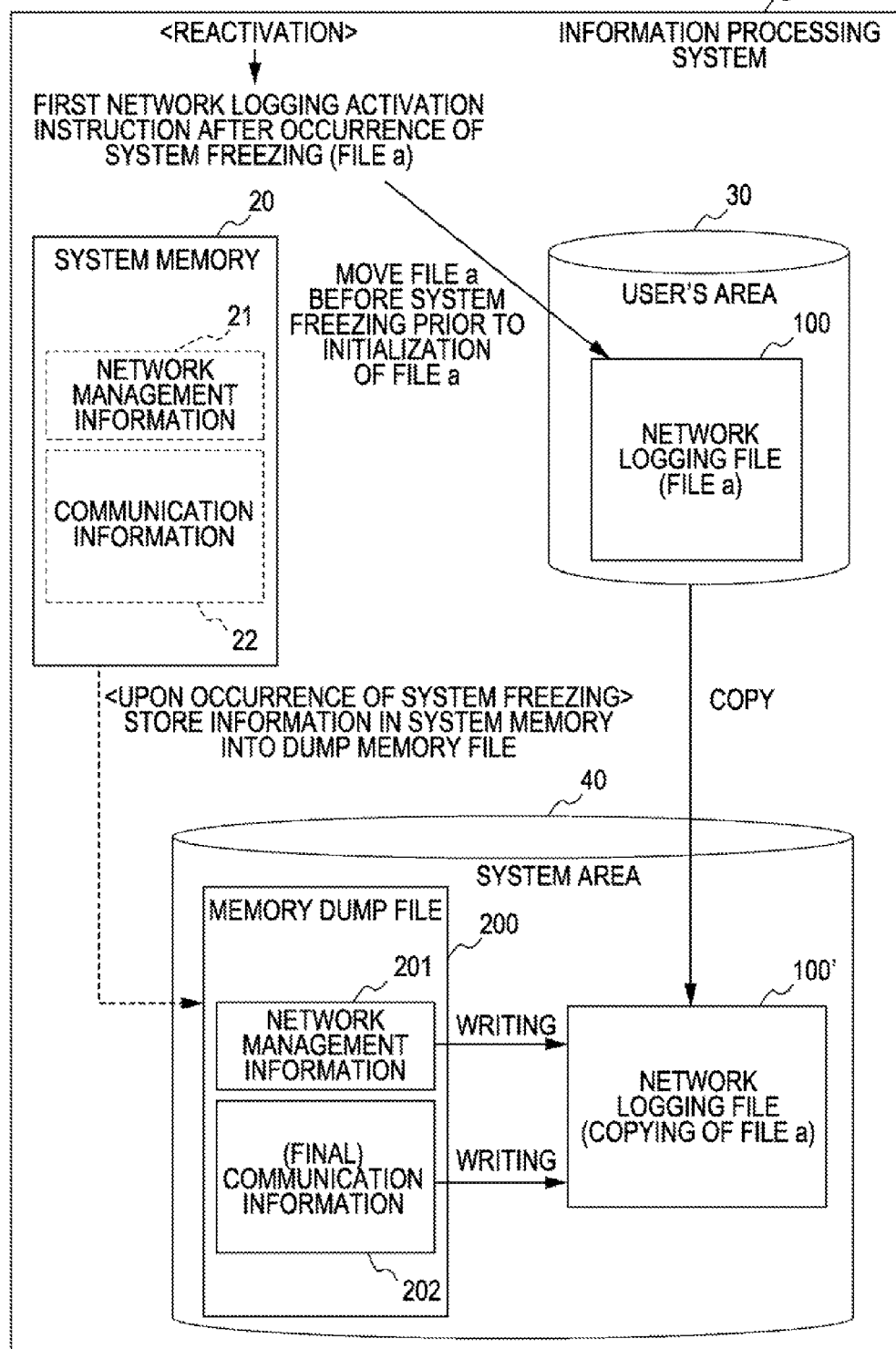

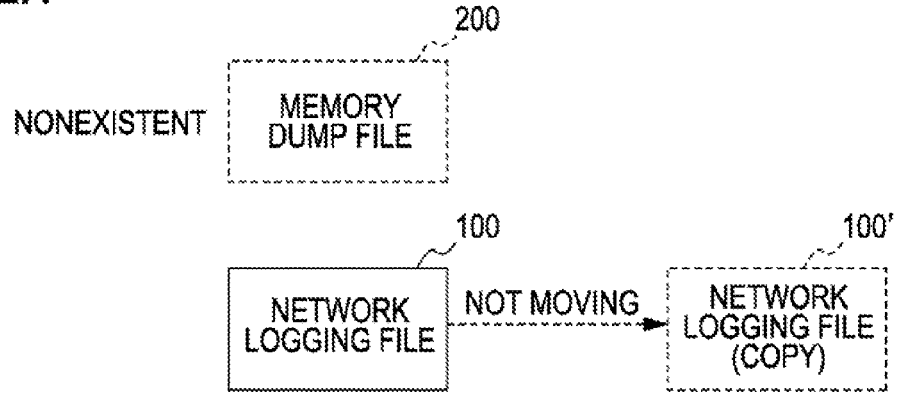
FIG. 2A UPON NORMAL NETWORK LOGGING ACTIVATION INSTRUCTION
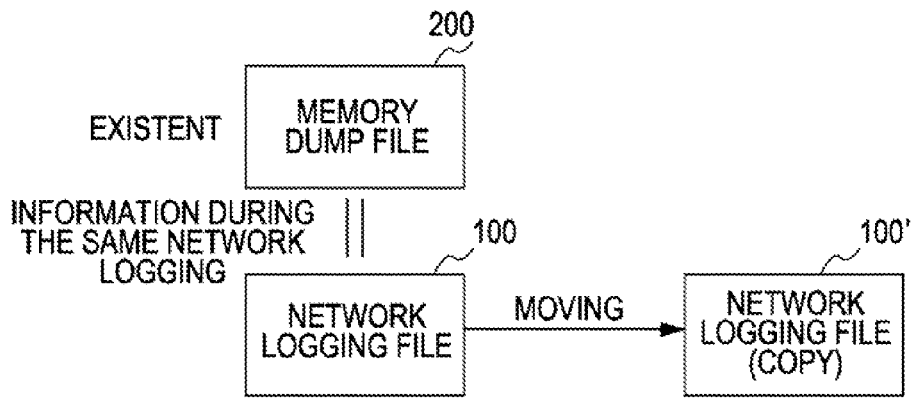
FIG. 2B UPON FIRST NETWORK LOGGING ACTIVATION INSTRUCTION AFTER OCCURRENCE OF SYSTEM FREEZING
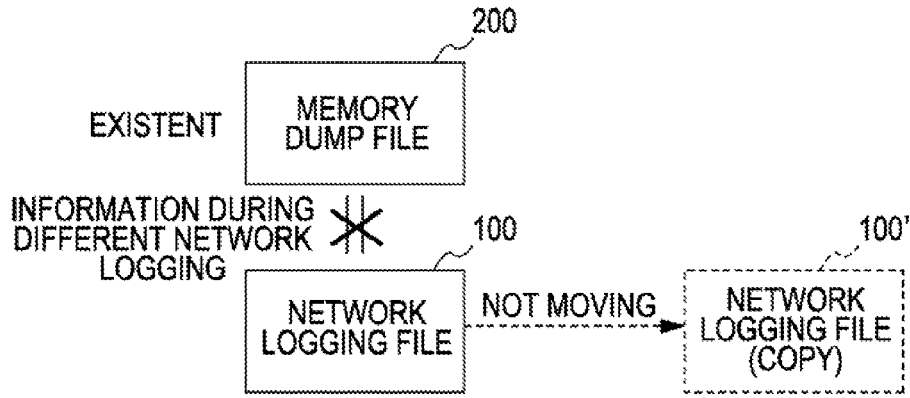
FIG. 2C UPON SECOND OR SUBSEQUENT NETWORK LOGGING ACTIVATION INSTRUCTION AFTER OCCURRENCE OF SYSTEM FREEZING

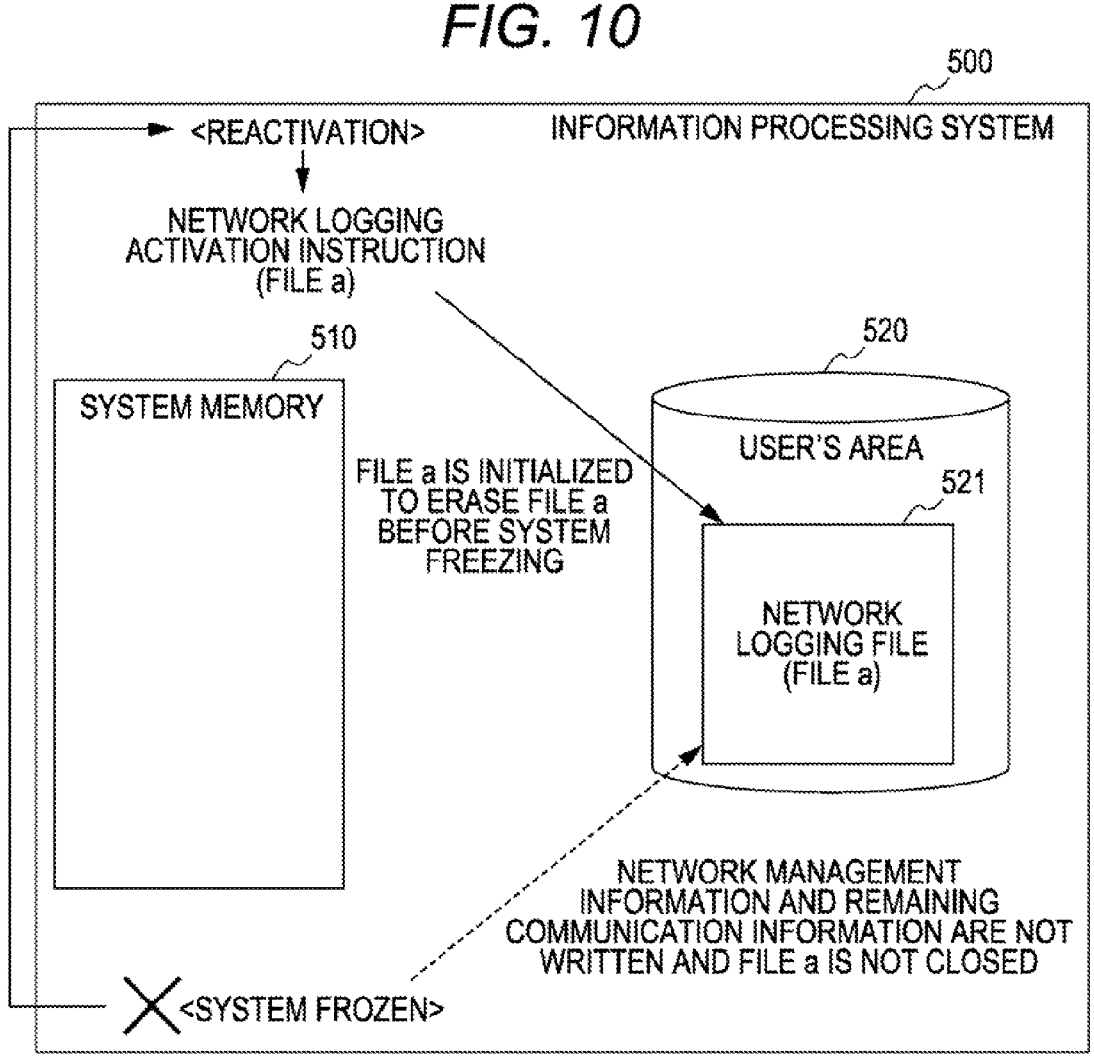

INFORMATION PROCESSING SYSTEM AND NETWORK LOGGING INFORMATION PROCESSING METHOD

CROSS-REFERENCE TO RELATED APPLICATION

This application is based upon and claims the benefit of priority of the prior Japanese Patent Application No. 2007-300258, filed on Nov. 20, 2007, the entire contents of which are incorporated herein by reference.

BACKGROUND

1. Field

An aspect of the present invention relates to a field of a network logging technology in an information processing system.

2. Description of the Related Art

The term "network logging" means collecting packets or data, including data running between a circuit driver and an application in an information processing system, and circuit input/output data. Networking logging is also called "trace." Network logging is executed for examination or inspection periodically or when any inappropriateness takes place.

FIG. 8 is a view illustrating an example of network logging. When receiving a network logging activation instruction from a user, an information processing system 500 initiates a network logging process. At this time, a network logging file 521 in which collected information is written is designated as a parameter for the network logging activation instruction. In the example of FIG. 8, file "a" is designated as the parameter.

The network logging file 521 stored in the user's area 520 of a disk, e.g., file "a" in FIG. 8, which is designated by the network logging activation instruction, is initialized. The user's area 520 is an area in the disk that may be basically used by any user or any application.

Thereafter, the network management information 511 and communication information 512 are stored and maintained in a system memory 510. Here, the network management information 511 is information for the overall management of the network logging, such as information for designating the network logging file 521 to which the collected information is written, a NEXT pointer representing the writing location of the network logging file 521, etc. The communication information 512 is information on communication packets collected by the network logging.

The communication information 512 stored in the system memory 510 is written to the network logging file 521 stored in the user's area 520 at a time point when a certain amount of communication information 512 has been accumulated in the system memory 510. At this time, taking processing performance into consideration, the network logging file 521 remains open during the network logging without being closed whenever the communication information 512 is written to the network logging file 521.

When receiving a network logging ending instruction, the information processing system 500 writes the final network management information 511 and the last communication information 521 remaining in the system memory 510 to the network logging file 521 and then closes the network logging file 521. The network logging file 521 thus acquired may be stored in other media as well as referred to.

In addition, there are prior art documents that disclose technologies associated with network logging, for example, patent document 1, patent document 2, and patent document 3. The patent document 1 discloses a technology of outputting log information of a communication path stored in a memory to an external memory device upon occurrence of a fault in the communication path. The patent document 2 discloses a technology of pausing update of log information stored in a memory upon occurrence of any fault. The patent document 3 discloses a technology of saving log information adjacent to the location where an error took place to a file corresponding to the content of the error at the time of occurrence of the error.

However, none of the patent documents 1 to 3 disclose any technology that automatically restores the network logging file being written upon occurrence of system freezing, or that restores the network logging information remaining in the memory upon occurrence of system freezing.

[Patent Document 1] Japanese Laid-Open Patent Publication No. 02-101556
[Patent Document 2] Japanese Laid-Open Patent Publication No. 11-003252
[Patent Document 3] Japanese Laid-Open Patent Publication No. 2002-312205

SUMMARY

An object of an aspect of the present invention is to provide a technology of automatically moving the network logging file by restoring the network logging file remaining in the user's area in the case where system freezing takes place during a network logging operation.

Another object of an aspect of the present invention is to provide a technology of reflecting the network logging information remaining in the memory upon occurrence of system freezing to the automatically restored network logging file.

According to one aspect of the present invention, an information processing system includes a memory, an external storage having a user's area and a system area, and a network logging processing unit collecting communication information in the system. The network logging processing unit has a processing unit that receives a network logging activation instruction, and determines, when a network logging activation instruction is received, whether memory dump information that is information stored in the memory at the time system freezing occurred exists in the system area.

The network logging processing unit also has a copying unit capable of copying the network logging file to the system area in the case where it is determined that the predetermined conditions are satisfied, and a writing means that writes the communication information stored and maintained in the memory dump information to the copied network logging file.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 1 is a view illustrating network logging according to an embodiment of the present invention;

FIGS. 2A, 2B and 2C are views illustrating an example of determining whether or not to perform moving of the network logging file;

FIG. 10 is a view illustrating an example when the system receives a network logging activation instruction after the reactivation of the system.

DETAILED DESCRIPTION OF THE EMBODIMENT

Figure 9:
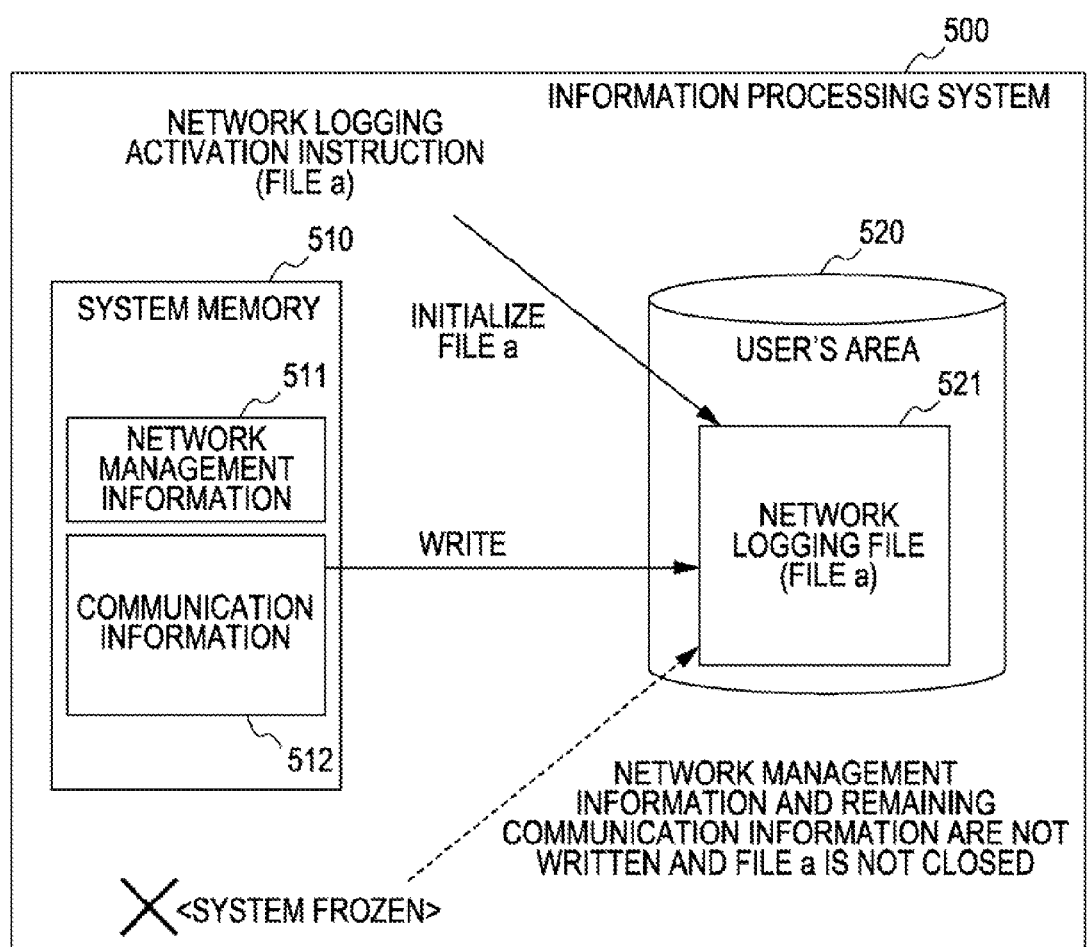
FIG. 9 is a view illustrating an example where system freezing takes place during network logging.

FIG. 9 is a view illustrating an example where a system has gone down during network logging. As shown in FIG. 9, freezing or crashing of an information processing system 500 may occur while a certain amount of communication information 512 accumulated in a system memory 510 by network logging is written to a network logging file 521.

At this time, when the system 500 is down for example, the communication information 512 remaining in the system memory 510 and the last network management information 511 fail to be outputted to the network logging file 521. Furthermore, the network logging file 521 may be impossible to refer to since the network logging file 521 is not closed.

FIG. 10 is a view illustrating an example when the system receives a network logging activation instruction after the reactivation of the system. It is assumed that after the system has been down, the information processing system 500 is reactivated to receive a network logging activation instruction.

At this time, if file "a" is designated as a parameter, the network logging file 521, that is file "a", could be initialized, so that the information that has been written to the network logging file 521 up to the point the system down occurred could be erased. If the network logging activation instruction is performed in a batch process, the network logging file 521 might be designated as the same file name every time.

As such, in the case where system freezing takes place during a network logging operation, the network logging file 521 being collected could be difficult to refer to if it is an incomplete file. In addition, the network logging instruction after reactivation of the system could lead to rewriting of the network logging file 521 stored in the user's area 520, which could erase the network logging information that existed at the time the system freezing occurred.

Moreover, in case of moving the incomplete network logging file 521 upon occurrence of system freezing, it has been necessary for a user to move and save the network logging file 521 on his/her own. In this case, however, the communication information 512 immediately before being output to the network logging file 521 is existent only as a system down file, in other words the memory information when the system was down, and thus it is impossible to refer to the communication information 512.

Network logging according to embodiments of the present invention will be described with reference to the accompanying drawings.

FIG. 1 is a view illustrating network logging according to an embodiment of the present invention. In an information processing system 1, network management information 21 and collected communication information 22 are accumulated in a system memory 20 during network logging.

The network management information 21 is information that is used to perform the overall management of the network logging. The network management information 21 includes information that designates a network logging file 100 to which the collected communication information 22 is written, an NEXT pointer that indicates a writing location of the network logging file 100, a circular use flag that indicates whether or not to circulate and write the communication information 22 to the network logging file 100, and the number of overall order GROUP names that indicates the number of GROUPS defining a communication. The communication information 22 is information on communication packets collected by the network logging.

The communication information 22 stored in the system memory 20 is written to the network logging file 100, "file a" shown in FIG. 1, when a certain amount of communication information 22 is accumulated in the system memory 20. Taking processing performance into consideration, the network logging file 100 remains open during network logging whenever the communication information 22 is written to the network logging file 100. The user's area 30 is an area of a disk which may be basically used by any user or any application.

In the case where a system freezes or crashes during network logging, actual addresses or virtual addresses related to the network management information 21 and communication information 22 remaining in the system memory 20 upon occurrence of system freezing are solved. Furthermore, the network management information 21 and the communication information 22 are held in a memory dump file 200 stored in a system area 40 of the disk as network management information 201 and the last communication information 202 respectively. At this time, the network logging file 100 stored in the user's area 30 remains open. The system area 40 is an area in the disk, which may be used only by the system, e.g., operating system (OS) or specially authorized programs.

If the information processing system 1 is reactivated after occurrence of system freezing and receives the first network logging activation instruction after the system freezing, the information processing system 1 copies the network logging file 100 stored in the user's area 30 to the system area 40 as a network logging file 100' prior to initialization of the designated network logging file 100, that is file "a".

The network management information 201 and the last communication information 202 contained in the memory dump file 200 stored in the system area 40 are written to the network logging file 100' copied into the system area 40. After the completion of writing the network management information 201 and the last communication information 202 to the network logging file 100', the network logging file 100' is closed.

Thereafter, the network logging file 100 stored in the user's area 30 is initialized to start new network logging.

As such, if the network logging file 100 at the point of system freezing is moved from the user's area 30 to the system area 40, and then the network logging file 100 stored in the user's area 30 is initialized, the network logging file 100 at the point of system freezing can be restored without erasing any information within the network logging file 100 at the point of system freezing. In addition, the network management information 21 or communication information 22 in the system memory 20 upon occurrence of system freezing may be restored by writing the network management information 201 and the last communication information 202 stored in the memory dump file 200 to the network logging file 100' copied in the system area 40.

FIGS. 2A though 2C are views illustrating an example of determining whether or not to perform moving of the network logging file. In the example of FIGS. 2A through 2C, it is assumed that the same file "a" is designated as a parameter for network logging activation instruction.

FIG. 2A depicts an example when a network logging activation instruction is made at a normal time, e.g., when no system freezing occurs. In the case where no memory dump file 200 exists in the system area 40, it may be determined that no system freezing occurred. Accordingly, if no memory dump file 200 exists in the system area 40, the network logging file 100 stored in the user's area 30 is not moved to the system area 40 even though a network logging activation instruction has been made.

FIG. 2B depicts an example when a first network logging activation instruction after the system freezing is issued. If a memory dump file 200 exists in the system area 40, it may be determined that system freezing occurred. Also, if the network logging information stored and maintained in the memory dump file 200, for example the network management information 201 and the last communication information 202 illustrated in FIG. 1, and the information contained in the network logging file 100 stored in the users area 30 are both the information from the same network logging time, it may be determined that the network logging file 100 upon occurrence of system freezing is still not moved. That is, in case of corresponding to the conditions of FIG. 2B, the received network logging activation instruction is determined as the first network logging activation instruction issued after the system has gone down, so that the network logging file 100 stored in the user's area 30 is moved to the system area 40.

FIG. 2C depicts an example when a second or subsequent networking logging activation instruction is issued after the system freezing occurs. If the memory dump file 200 is existing in the system area 40, it may be determined that system freezing occurred. However, if the information stored and maintained in the memory dump file 200 during network logging and the information contained in the network logging file 100 stored in the user's area 30 are both the information from different network logging times, the network logging file 100 upon occurrence of system freezing has already been moved, and therefore, it may be determined that the network logging file 100 stored in the user's area 30 has been newly initialized. That is, in case of corresponding to the conditions of FIG. 2C, it may be determined that the received network logging activation instruction is a second or subsequent network logging activation instruction, and therefore, the network logging file 100 stored in the user's area 30 is not moved to the system area 40.

Figure 3:
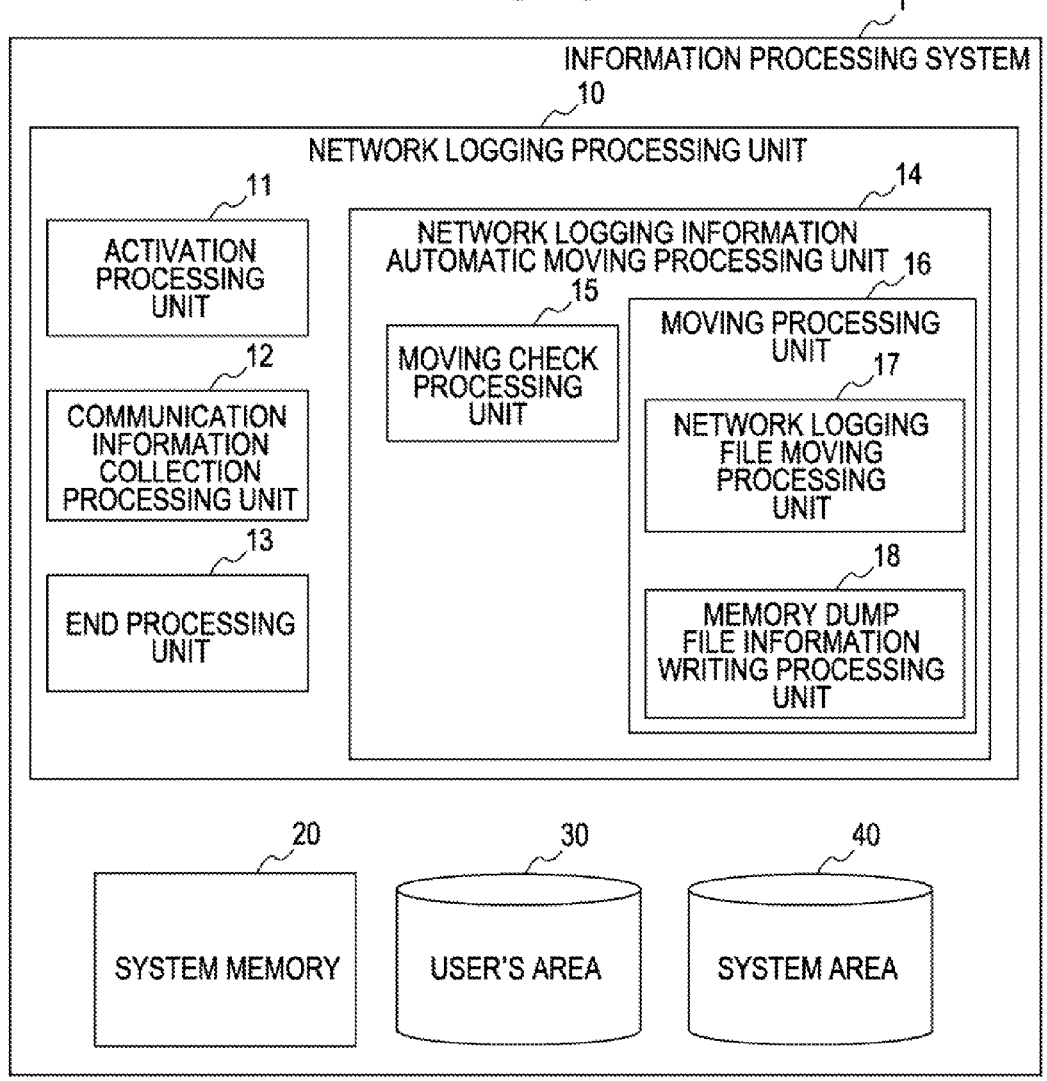
FIG. 3 is a view illustrating a configuration example of an information processing system according to an embodiment of the present invention.

FIG. 3 is a view illustrating a configuration example of an information processing system according to an embodiment of the present invention. The information processing system 1 is a computer that includes a Central Processing Unit (CPU) and a memory, a network logging processing unit 10, a system memory 20, and a user's area 30 and a system area 40 that may be a disk or disks.

The network logging processing unit 10 is a program that is executed by the CPU provided in the information processing system 1. The program may be stored in the memory. The network logging processing unit 10 includes an activation processing unit 11, a communication information collection processing unit 12, an end processing unit 13, and a network logging information automatic moving processing unit 14. The network logging information automatic moving processing unit 14 includes a moving check processing unit 15 and a moving processing unit 16. The moving processing unit 16 includes a network logging file moving processing unit 17 and a memory dump file information writing processing unit 18.

The activation processing unit 11 performs a network logging activation process in response to a network logging activation instruction. The activation processing unit 11 also performs an initialization process of the network logging file 100 stored in the designated user's area 30.

The communication information collection processing unit 12 performs a network logging process. The communication information collection processing unit 12 collects and stores communication information 22 into the system memory 20, and repeats writing of the accumulated communication information 22 to the network logging file 100 up to a point when a certain amount of communication information 22 has been accumulated in the system memory 20.

The end processing unit 13 receives a network logging ending instruction and performs a network logging ending process. The end processing unit 13 ends collecting of the communication information, writes the network management information 21 or communication information 22 remaining in the system memory 20 to the network logging file 100 stored in the user's area 30, and then closes the network logging file 100.

The network logging activation instruction or network logging ending instruction may be carried out by a user's entry of commands or in a series of batch processes.

Figure 4:
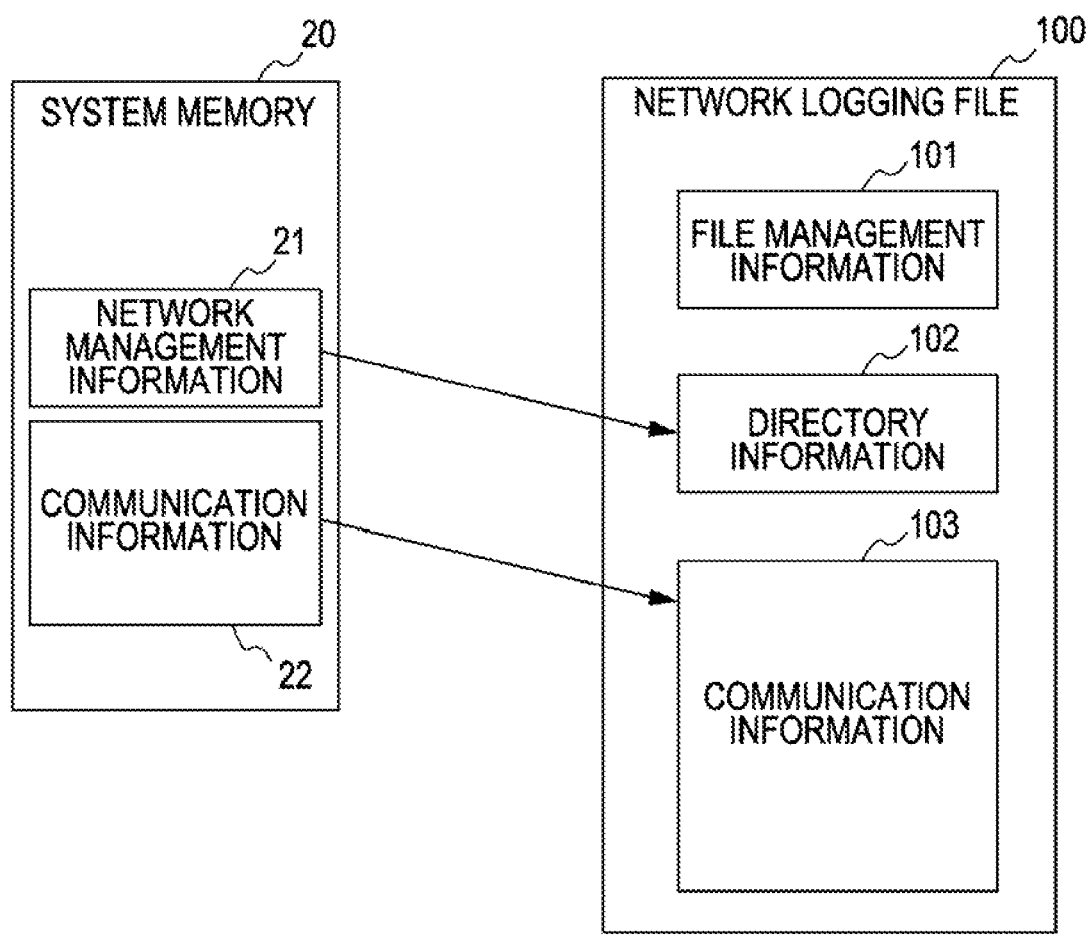
FIG. 4 is a view illustrating writing to a network logging file during network logging.

FIG. 4 is a view illustrating a process of writing information to a network logging file during network logging. During the network logging, the network management information 21 managing network logging, and the communication information 22 collected by network logging are written to the system memory 20.

As described above, the communication information 22 collected in the system memory 20 is written to the network logging file 100 as the communication information 103 whenever a certain amount of communication information 22 is stored in the system memory 20. Where communication information 22 is written to the network logging file 100 in order, the communication information 22 may continue to be stored in the network logging file 100 as the communication information 103, In this case, the area for the communication information 103 in the network logging file 100 may become full and the information may be repeatedly overwritten if the network logging file 100 has a certain limit to the area for storing the communication information 103.

When the network logging is completed, the communication information 22 remaining in the system memory 20 is written to the network logging file 100. In addition, the network management information 21 stored in the system memory 20 is analyzed, written to the network logging file 100 as directory information 102, and then the network logging file 100 is closed. The file management information 101 contained in the network logging file 100 is information that is used to perform the overall management of the network logging file 100.

In the case where system freezing occurred during network logging, the network management information 21 or communication information 22 that is not yet written in the network logging file 100 is maintained in the system memory 20. At this time, the network logging file 100 remains open, with part of the communication information 103 moved into the directory information 102.

The moving of the network logging file 100 stored in the user's area 30 is not performed when system freezing occurs in order to prevent unanticipated operations, such as further system freezing or crashing, that could occur during handling of the previous system freezing.

Referring to FIG. 3, in the case where the system is down, the information processing system 1 is reactivated and the first network logging instruction after the system freezing is received, the network logging information automatic moving processing unit 14 moves the network logging file 100 at the time of the system freezing from the user's area 30 to the system area 40 before the process of network logging is activated by the activation processing unit 11. The network logging information automatic moving processing unit 14 includes the moving check processing unit 15 and the moving processing unit 16.

The moving check processing unit 15 checks whether or not the network logging file 100 stored in the user's area 30 is moved to the system area 40 before the initialization of the network logging file 100, upon activation of the network logging process.

The moving check processing unit 15 first checks whether or not the memory dump file 200 is existing in the system area 40. In the case where the memory dump file 200 does not exist in the system area 40, the moving check processing unit 15 does not perform the moving of the network logging file 100 because it is determined that system freezing did not occur.

Next, the moving check processing unit 15 checks whether or not the file name of the network logging file 100 designated by the network logging activation instruction is the same as the file name of the network logging file 100 designated as a writing destination of the communication information 22 by the network management information 201 contained in the memory dump file 200. The moving check processing unit 15 checks whether or not the file name and the library name of the network logging file 100 designated by the network logging activation instruction are same as the file name and the library name of the network logging file 100 designated by the network management information 201 contained in the memory dump file 200, respectively. The library name is information that indicates the storing area of a file.

The network logging file 100 designated by the network logging activation instruction is a file to which the communication information 22 collected by network logging is written after initialization. The network logging file 100 designated by the network management information 201 contained in the memory dump file 200 is a network logging file 100 to which the communication information 22 has been written, which was collected by network logging during system freezing. The matching in file name between these two network logging files means that there could be a possibility that the network logging file 100 left in the user's area 30 upon occurrence of system freezing may be initialized by the network logging activation process.

In the case where the file name of the network logging file 100 designated by the network logging activation instruction does not match the file name of the network logging file 100 designated by the network management information 201 contained in the memory dump file 200, initialization of the network logging file 100 left in the user's area 30 upon occurrence of system freezing is not performed. Therefore, the moving of the network logging file 100 is not performed in this case.

Thereafter, the moving check processing unit 15 checks whether or not the network logging file 100 stored in the user's area 30 is same as the network logging file 100 at the point of system freezing. That is, the moving check processing unit 15 checks whether or not the network logging file 100 information stored in the user's area 30 is from the same network logging time as the network management information 201 and the communication information 202 contained in the memory dump file 200.

At this time, the information to be checked may include, for example, a NEXT pointer that has been managed as the network management information 21 in the system memory 20 before occurrence of system freezing, a circular use flag, and the number of overall order GROUP names. The information to be checked may vary according to the network logging process or design of the network logging file 100.

Hereinafter, a case will be described that checks three types of information: a NEXT pointer, a circular use flag, and the number of overall order GROUP names. Here, all information contained in the network management information 201 stored in the memory dump file 200 is previously designed in a certain place, and therefore, may be simply obtained for example by solving relative addresses.

In case of checking a NEXT pointer that indicates the writing location in the network logging file 100, the moving check processing unit 15 obtains the information on the NEXT pointer that exists in a certain place in the network management information 201 contained in the memory dump file 200. In addition, the moving check processing unit 15 reads the information of the network logging file 100 stored in the user's area 30 by a given unit, and compares date information on when the communication information 103 has been stored to calculate the NEXT pointer. The moving check processing unit 15 checks whether or not the NEXT pointer of the network management information 201 matches the NEXT pointer calculated from the network logging file 100.

In case of checking a circular use flag that indicates whether or not to circulate the communication information for writing of the communication information 22 to the network logging file 100, the moving check processing unit 15 obtains the information on the circular use flag that exists in a certain place in the network management information 201 contained in the memory dump file 200. In addition, the moving check processing unit 15 reads the information of the network logging file 100 stored in the user's area 30 by a given unit, and compares date information on when the communication information 103 has been stored to analyze the presence or absence of a circular use. The moving check processing unit 15 checks whether or not the circular use flag of the network management information 201 matches the presence or absence of the circular use analyzed from the network logging file 100.

In case of checking the number of the overall order GROUP names that indicate the number of GROUPS each of which defines a communication, the moving check processing unit 15 obtains the information on the number of the overall order GROUP names that exists in a certain place in the network management information 201 contained in the memory dump file 200. In addition, the moving check processing unit 15 reads the information of the network logging file 100 stored in the user's area 30 by a given unit, and counts the GROUP names existing in the place storing the GROUP names to calculate the number of the overall order GROUP names. The moving check processing unit 15 checks whether or not the number of the overall order GROUP names in the network management information 201 matches the number of the overall order GROUP names calculated from the network logging file 100.

In the embodiment, in the case where there is a discrepancy with respect to at least any one of the NEXT pointer, the circular use flag, and the overall order GROUP names, it can be determined that the network logging file 100 stored in the user's area 30 is not the network logging file 100 upon occurrence of system freezing, but is the network logging file 100 produced by new network logging after system freezing. Therefore, the moving of the network logging file 100 is not performed in this case.

If the memory dump file 200 is existing in the system area 40, the file name of the network logging file 100 designated by the network logging activation instruction is same as the file name of the network logging file 100 designated by the network management information 201 contained in the memory dump file 200, and the network logging file 100 stored in the user's area 30 is same as the network logging file 100 upon occurrence of system freezing, the moving check processing unit 15 determines that the network logging file 100 will be moved before the initialization of the network logging file 100 upon occurrence of system freezing.

In the case where it is determined that the network logging file 100 will be moved by the moving check processing unit 15, the moving processing unit 16 moves the network logging file 100 stored in the user's area 30 to the system area 40, and performs writing of the network management information 201 and the last communication information 202 contained in the dump memory file 200. The moving processing unit 16 includes a network logging file moving processing unit 17 and a memory dump file information writing processing unit 18.

The network logging file moving processing unit 17 performs such moving of information by copying the network logging file 100 remaining in the user's area 30 upon occurrence of system freezing to the system area 40. At this time, the copied network logging file 100' changes its file name to a system fixed name, taking into consideration outputting the network logging file 100' to any media later by a maintenance function. In addition, the content of the file stored in the user's area 30 that cannot be referred to due to any damages or failures is written to the system area 40 by a direct input/output command without using a file access function of a file management system provided in OS.

The memory dump file information writing processing unit 18 writes the network management information 201 and the final communication information 202 contained in the memory dump file 200 that is network logging information left in the system memory 20 upon occurrence of system freezing to the copied network logging file 100' and then closes the network logging file 100'. The network logging file 100' closed in the system area 40 may be output from the system area 40 to another medium by a maintenance function provided by the information processing system 1.

Figure 5:
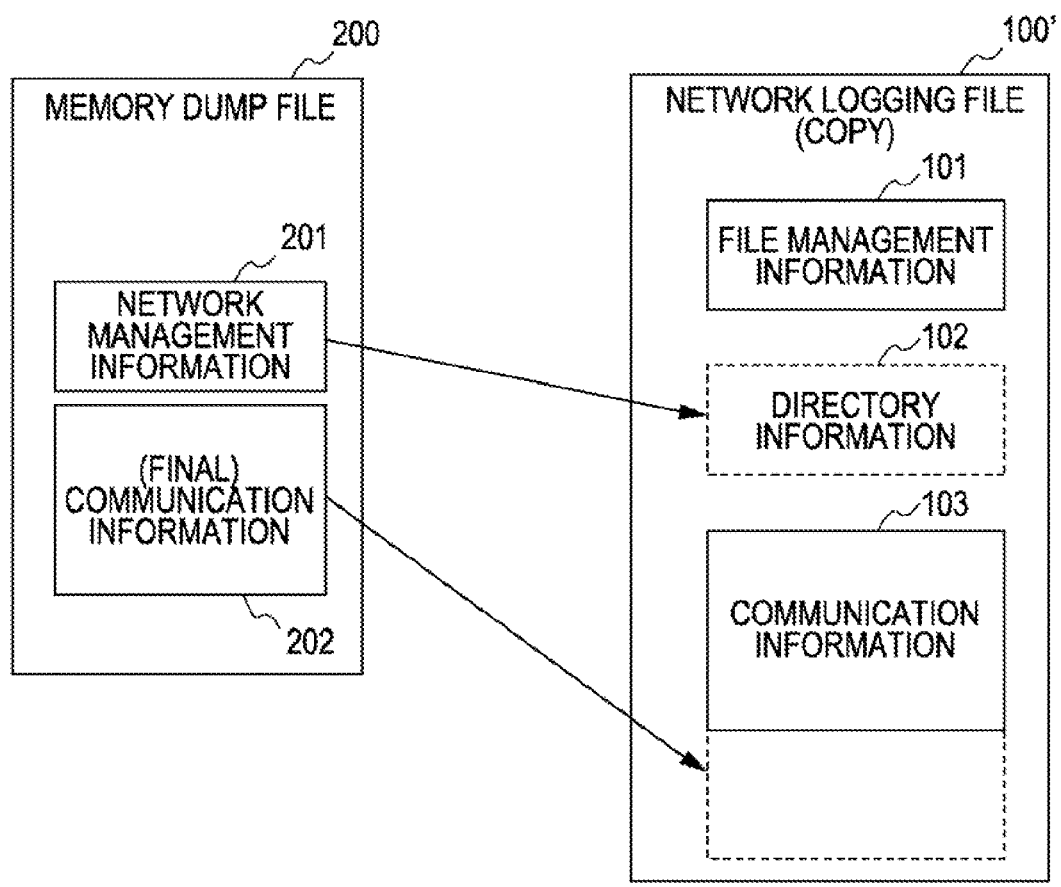
FIG. 5 is a view illustrating writing to a network logging file moved to a system area.

FIG. 5 is a view illustrating writing to a network logging file that has been moved into a system area. The network logging file 100' copied to the system area 40 with part of the communication information 103 and part of the directory information 102 removed due to system freezing which occurred during network logging. The network management information 201 and the final communication information 202 stored and maintained from the system memory 20 upon occurrence of system freezing exist in the memory dump file 200.

The memory dump file information writing processing unit 18 writes the final communication information 202 stored and maintained in the memory dump file 200 to the network logging file 100' as additional information of the communication information 103 of the network logging file 100'. The memory dump file information writing processing unit 18 analyzes the network management information 201 stored and maintained in the memory dump file 200, and writes the analyzed network management information 201 to the network logging file 100' as the directory information 102. Then, the memory dump file information writing processing unit 18 closes the network logging file 100'.

Figure 6:
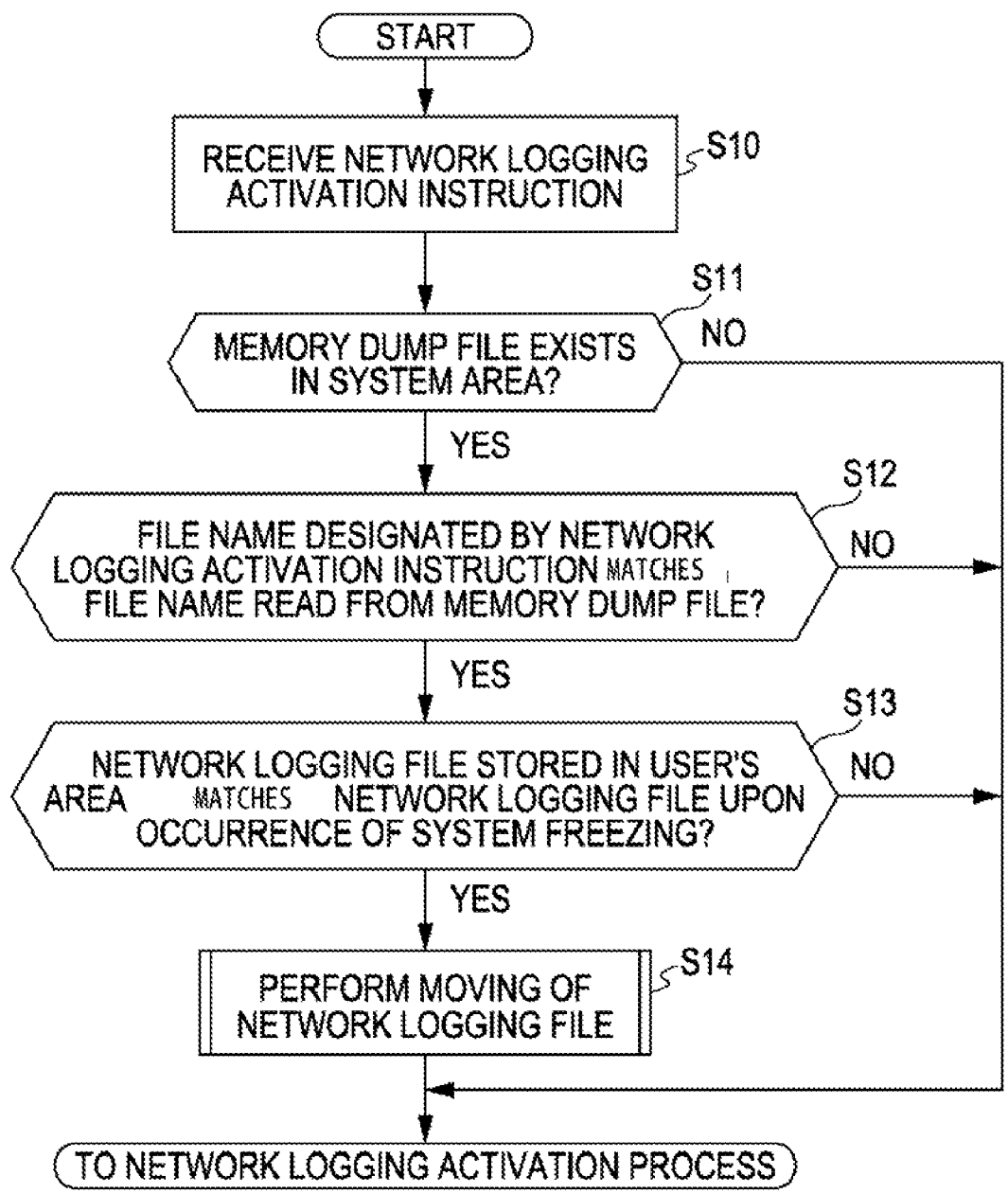
FIG. 6 is a flowchart illustrating a moving process of a network logging file by a network logging information automatic moving processing unit according to an embodiment of the present invention.

FIG. 6 is a flowchart illustrating a moving process of a network logging file by a network logging information automatic moving processing unit 17 according to an embodiment of the present invention. The network logging information automatic moving processing unit 14 first receives a network logging activation instruction (step S10) to check whether or not any memory dump file 200 is existing in the system area 40 (step S11). Where it is determined that no memory dump file 200 exists in the system area 40 (step S11, No), the process skips to a network logging activation step.

Where it is determined that a memory dump file 200 exists in the system area 40 (step S11, Yes), the network logging information automatic moving processing unit 14 checks whether or not the file name of the network logging file 100 designated by the network logging activation instruction matches the file name of the network logging file 100 designated as a writing destination of the communication information 22 by the network management information 201 contained in the memory dump file 200 (step S12). Where it is determined there is a discrepancy between the two file names (step S12, NO), the process skips to the network logging activation step.

Where it is determined that both file names match each other (step S12, YES), the network logging information automatic moving processing unit 14 checks whether or not the network logging file 100 stored in the user's area 30 is same as the network logging file 100 upon occurrence of system freezing (step S13). If the network logging file 100 stored in the user's area 30 is not same as the network logging file 100 upon occurrence of system freezing (step S13, NO), the process skips to the network logging activation step.

If it is determined that the memory dump file 200 exists in the system area 40 in step S11, the two file names match to each other in step S12, and the network logging file 100 stored in the user's area 30 matches the network logging file 100 upon occurrence of system freezing in step S13, then moving of the network logging file is performed (step S14) and then the process goes to the network logging activation step. Further detailed descriptions on the network logging file moving process will be given later with reference to FIG. 7.

According to the embodiment, step S12 may be omitted from the process so that the check on whether or not the two file names are consistent with each other may not be performed. If step S12 is omitted from the process, then the moving of the network logging file 100 left in the user's area 30 upon occurrence of system freezing may be performed by the first network logging activation instruction after system freezing took place, even though the file name of the network logging file 100 designated by the network logging activation instruction is different from the file name of the network logging file 100 left in the user's area 30 upon occurrence of system freezing.

Figure 7:
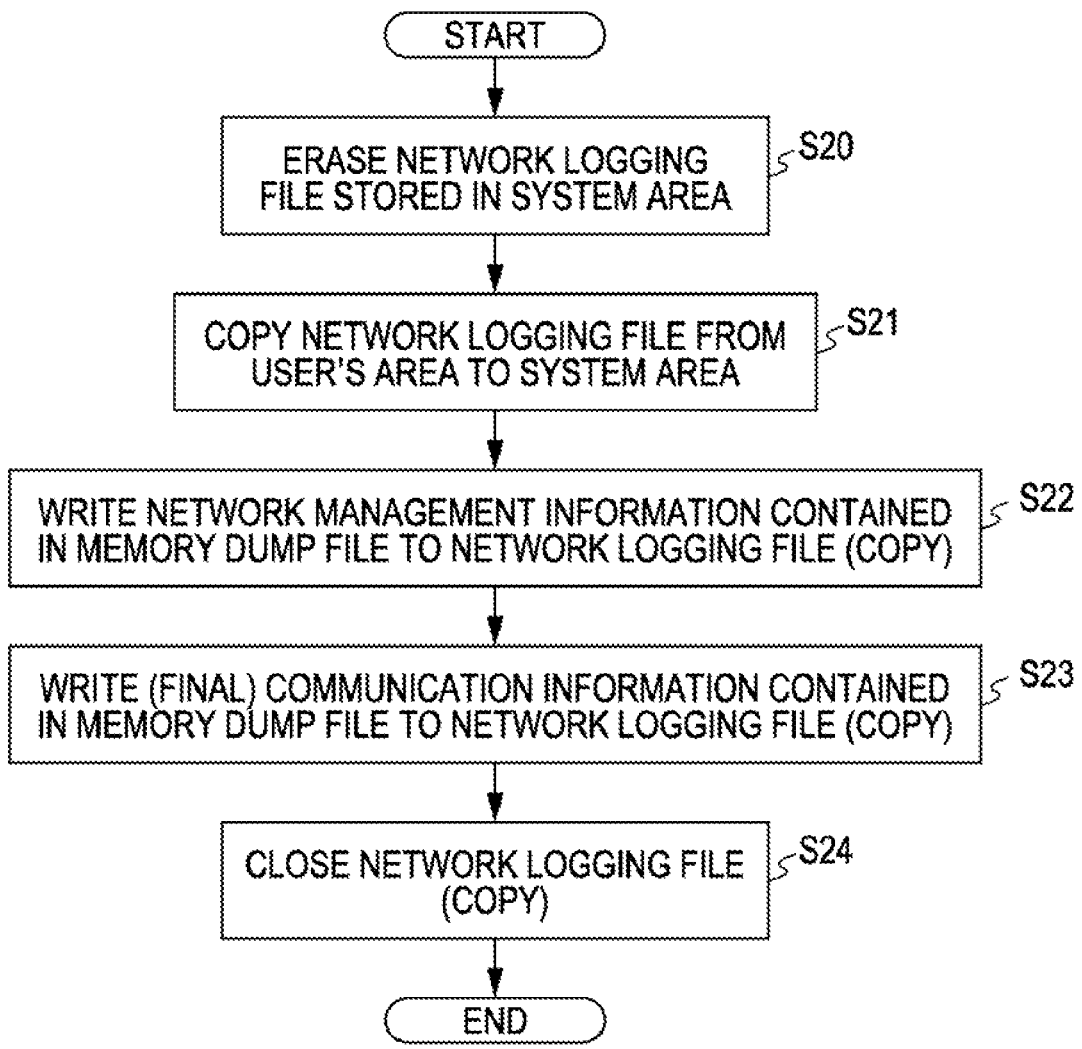
FIG. 7 is a flowchart illustrating a moving process of a network logging file by a moving processing unit according to an embodiment of the present invention.
Figure 8:
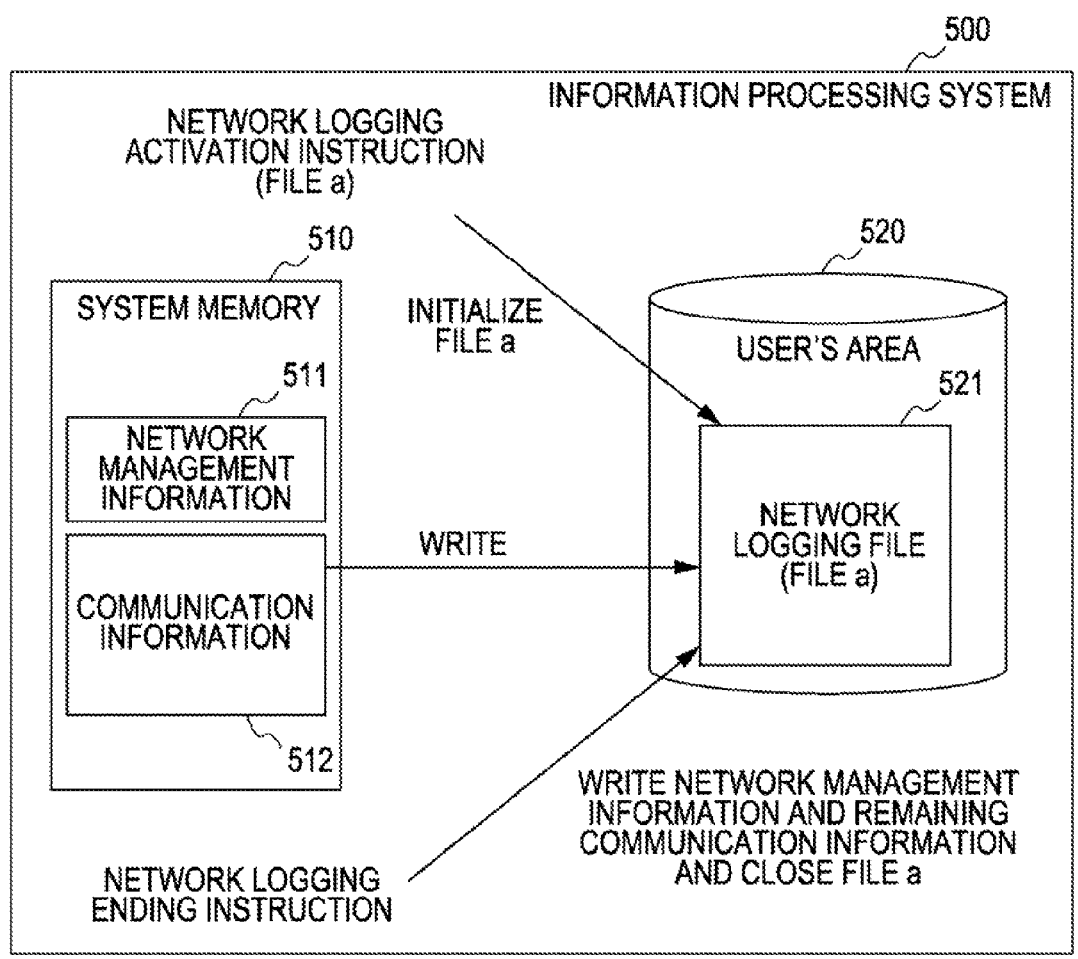
FIG. 8 is a view illustrating an example of network logging.

FIG. 7 is a flowchart illustrating a moving process of a network logging file by a moving processing unit according to an embodiment of the present invention. If it is determined that the network logging file 100 will be moved, the moving processing unit 16 deletes an old network logging file 100' if one or more are left in the system area 40 (step S20). Then, the moving processing unit 16 copies the network logging file 100 from the user's area 30 to the system area 40 (step S21).

Next, the moving processing unit 16 writes the network management information 201 contained in the memory dump file 200 to the copied network logging file 100' (step S22), and writes the final communication information 202 contained in the memory dump file 200 to the copied network logging file 100' (step S23). Finally, the moving processing unit 16 closes the network logging file 100' (step S24).

The process by the network logging processing unit 10 that includes the network logging information automatic moving processing unit 14 as described above may be implemented as a computer and a software program, and such a software program may be recorded in a computer-readable recording medium as well as provided over a network.

According to the above embodiments of the present invention, in the case where system freezing takes place during a network logging operation, the network logging file 100 left in the user's area 30 may be restored and automatically moved.

In addition, the network logging information such as the network management information 21 and the communication information 22 left in the system memory 20 upon occurrence of system freezing may be reflected onto the automatically restored network logging file 100'. By doing so, the communication information 22 immediately before occurrence of system freezing may be referred to in inspecting the moved network logging information, that is, the network logging file 100'.

Since the moving process of the network logging file 100 is performed only upon the first activation of the network logging operation after occurrence of system freezing, unnecessary moving processes may be avoided, and therefore, the time required for moving may be reduced, thus leading to decrease in loads applied to the information processing system 1.

Although the embodiments of the present invention have been described above, the present invention is not limited thereto. For instance, the information to be checked to determine whether or not the moving of the network logging file 100 will be performed, or places where the information exists may vary depending on the network logging process or design of the network logging file 100. As an example, in the case where it is determined whether or not the network logging file 100 stored in the user's area 30 matches the network logging file 100 upon occurrence of system freezing, it may be sufficient to check information by which the possibility of matching may be identified.

According to one aspect of the present invention, it may be possible to prevent inability of inspection caused by omission of the network logging information moving operation. In addition, unnecessary moving operations may be avoided and therefore time required for moving may be shortened, thus making it possible to reduce loads to the system occurring during normal operations. In the case where the system normally ends its operations, the moving of the network logging information upon activation of system is not performed, and thus the system activation time is not affected.

Moreover, the communication information immediately before occurrence of system freezing may be referred to in inspecting the moved network logging information, and this may help to find the cause of system freezing.

What is claimed is:

1. A computer-readable recording medium storing a network logging processing program to be executed in a computer of an information processing system including a memory and an external storage having a user's area and a system area, the network logging processing program is for collecting communication information in the system, wherein the program enables the computer to function as:
   means for, upon receiving a network logging activation instruction, determining whether memory dump information that contains information of the memory at the time of system freezing occurred is stored in the system area, determining whether information for specifying a file for storing collected communication information designated by the network logging activation instruction matches with information for specifying a file for writing communication information collected by network logging at the time of the system freezing contained in the memory dump information, and determining whether both communication information recorded in a network logging file stored in the user's area and communication information contained in the memory dump information are information collected at the same network logging process;
   means for copying the network logging file to the system area in the case where it is determined that each of the conditions are satisfied;
   means for writing the communication information contained in the memory dump information to the copied network logging file; and
   means for restoring the network logging file at the time of system freezing.

2. An information processing system including a memory, an external storage having a user's area and a system area, and a network logging processing unit collecting communication information in the system, the network logging processing unit comprising:
   a processing unit that receives a network logging activation instruction, and determines, when the network logging activation instruction is received, whether memory dump information that is information of the memory at the time system freezing occurred exists in the system area, whether information that specifies a file for storing collected communication information designated by the network logging activation instruction matches with information contained in the memory dump information that specifies a file for storing communication information collected by network logging at the time of the system freezing, and whether both communication information recorded in a network logging file stored in the user's area and communication information contained in the memory dump information are collected at the same network logging process;
   a copying unit capable of copying the network logging file to the system area in the case where it is determined that the given conditions are satisfied;
   a writing unit that writes the communication information contained in the memory dump information to the copied network logging file; and
   a restoring unit that restores the network logging file at the time of system freezing.

3. An automatic network logging information moving method performed by an information processing system including a memory, an external storage having a user's area and a system area, and a network logging processing unit for collecting communication information in the system, the method comprising:

determining, by the network logging processing unit, whether or not to satisfy each of conditions that, memory dump information that contains information on the memory at the time of system freezing is stored in the system area, information for specifying a file for storing collected communication information designated by the network logging activation instruction matches with information contained in the memory dump information for specifying a file for storing that writes communication information collected by the network logging at the time of occurrence of system freezing, and both of the communication information recorded in a network logging file stored in the user's area and matches the communication information stored contained in the memory dump information are collected at the same network logging process, upon receiving a network logging activation instruction;

copying, by the network logging processing unit, the network logging file to the system area in the case where it is determined that all of the conditions are satisfied;

writing, by the network logging processing unit, the communication information stored and maintained contained in the memory dump information to the copied network logging file; and restoring the network logging file at the time of system freezing.

* * * * *